Aug. 20, 1940.  A. W. WENZEL  2,212,336

PACKING RING

Filed June 29, 1937

INVENTOR.
ALBERT W. WENZEL.
BY Howard P. King
ATTORNEY.

Patented Aug. 20, 1940

2,212,336

UNITED STATES PATENT OFFICE 2,212,336

PACKING RING

Albert W. Wenzel, West Orange, N. J.; Fidelity Union Trust Company, executor of said Albert W. Wenzel, deceased, assignor to Fidelity Union Trust Company, as trustee Application June 29, 1937, Serial No. 151,043

4 Claims. (Cl. 309—31)

This invention relates to packing rings, and more particularly to packing rings of the metallic type as generally employed in connection with reciprocating pistons in cylinders, such as internal combustion engines.

The objects of the invention are to provide a packing ring having improved characteristics, greater sealing power, and longer life; to employ the pressure within the cylinder as a means for counteracting wear of the ring; to counteract uneven wear of the ring against the cylinder wall; to apply a moment of force against the outside periphery of the ring during periods of use when the ring would otherwise be under influence of an opposite distorting moment of force; to provide means for automatically balancing the opposed force for maintaining the ring in its circular condition; to avoid any weakening effects of structures at the part of the ring where greatest strength is required; to utilize the cylinder pressure to maintain the ring seated against the far side of its groove; to secure simplicity of construction and operation; and to obtain other advantages and results as may be brought out in the following description.

Referring to the accompanying drawing in which like numerals of reference indicate similar parts throughout the several views.

Figure 1:
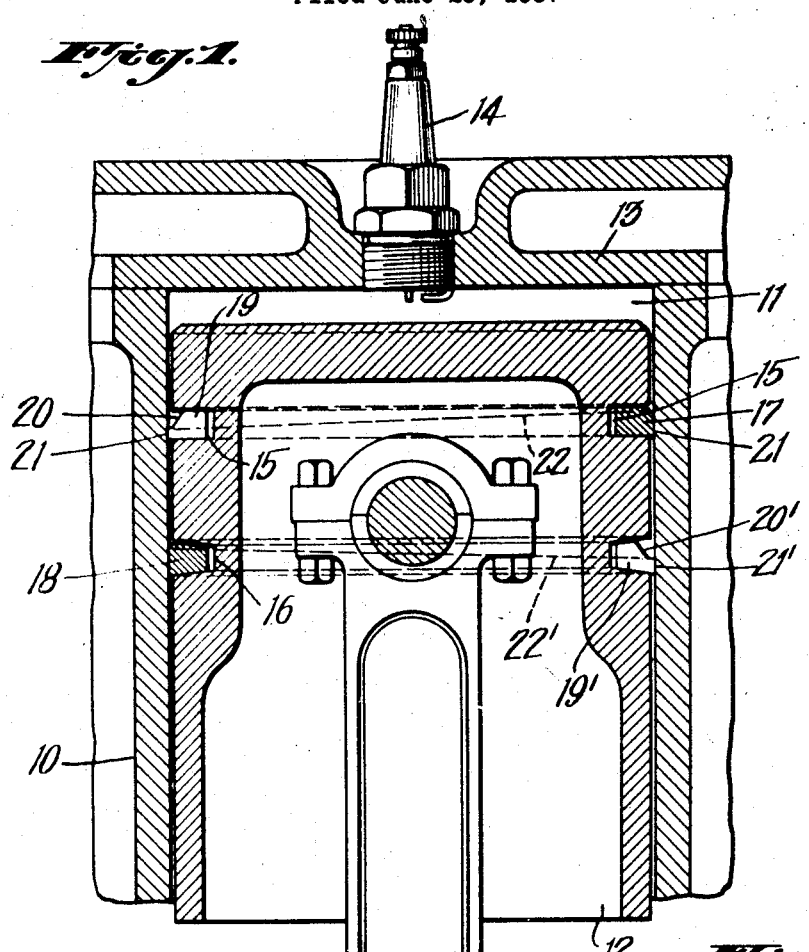
Figure 1 is a sectional view longitudinally and diametric to a cylinder and piston in which the present invention is mounted.

In the specific embodiment of the invention illustrated in said drawing, the reference numeral 10 indicates a portion of an engine providing cylinder 11 within which may be reciprocated a piston 12, the cylinder being closed at its compression end by a head 13. For purposes of making a specific disclosure, the engine is to be understood as of the internal combustion type, for which reason a spark plug 14 is illustrated within head 13 so that the fuel may be fired and the piston impelled by resultant expanding gases, as usual. It is to be understood, however, that the invention is not limited to internal combustion engines, as it is likewise applicable in connection with other types of engines all of which have the common attribute of providing a motivating medium under pressure within the compression end of the cylinder by which the piston is impelled toward the crank case end thereof.

For purposes of illustrating the present invention, a piston is illustrated in Fig. 1 as having ring receiving grooves 15 and 16 in its outer wall or circumference. It will be observed that these ring receiving grooves are different in shape, the cross-section of one being rectangular and the other being trapezoidal. However, the shape of either groove or both grooves may be changed or their situations reversed or altered or other grooves provided in greater or less number as found desirable.

Figure 2:
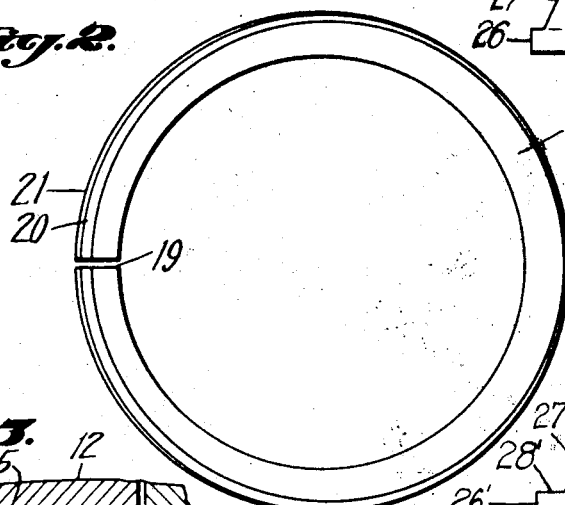
Figure 2 is a plan view of a ring according to the invention.

For purposes of the present description, a ring 17 is shown in the rectangular shaped groove 15, and Figure 2 may be considered as a plan of this ring. It will be understood, however, that a plan of ring 18 shown mounted in the trapezoidal groove 16 will be identical with the plan of ring 17 and has therefore not been specifically illustrated in a separate view.

It has been found in practice that all piston rings, both new and after a period of service, not only require but actually have a clearance between their flat faces and the flat faces of the ring receiving grooves. This clearance is an unavoidable necessity to accommodate freedom of movement of the ring to move in a radial direction and to obtain the desired resilient expansion moment of force inherent in the ring structure to engage the ring tightly against the cylinder wall. The present ring is similarly resilient and expansive to engage the cylinder wall and as to clearance between its flat faces and the flat faces of the receiving grooves fulfilling requirements of present day specifications and requirements of use for giving the necessary freedom of movement of the ring to perform its sealing function. The clearance heretofore provided and as also provided in the present disclosure results in a proportion of the compression created in the compression end of the cylinder to leak through to the inner circumference of the ring into the spaces between the bottom of the grooves and said inner circumference of the ring. The compression thus passed into the bottom of the grooves exerts a moment of force against the ring tending to expand it. A careful study of the effect of this force shows that it has heretofore caused the outer circumferential face of the ring at either side of the split 19 to wear down much more rapidly than the outer circumferential face portion of the ring opposite from the split. Thus wear is greatest right at the split and gradually decreases and disappears on the arcuate outer surface within a segment of less than 90° each way from the split. Apparently this excessive wearing results from the fact that the free ends of the ring are more responsive to flexing from the moment of force above described and thus have greater frictional contact with the cylinder wall and wear down more rapidly than portions of the outer circumferential surface of the ring remote from the split.

According to the present invention I provide means for exerting a counteracting force exerted radially inward upon the outer circumference of the ring in the region where greatest wear has heretofore been observed. This counteracting force will therefore tend to reduce the frictional engagement of the ring in the region of the split against the cylinder and will thus reduce the wear on the outer cylindrical surface at that region.

Figure 3:
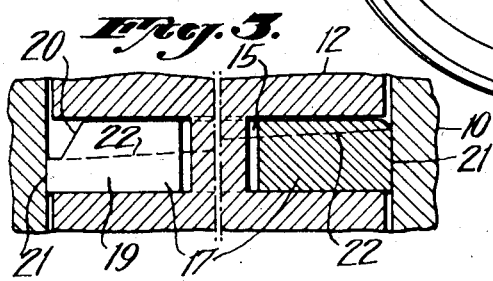
Figure 3 is a sectional view of a portion of the cylinder and piston and of the ring of the present invention with the mid part thereof broken away and upon a larger scale than shown in Figure 1.

In carrying out the invention, and describing the same with regard to the specific showing in Figures 1 and 3 of the drawing, the outer circumference of the ring is preferably stepped back, as at 20, from the cylinder engaging circumferential surface 21 of the ring so as to provide an inset outer circumferential area for the ring which will be directly subject to the action of the fluid pressure in the cylinder. This stepped portion 20 of the ring is preferably of a differential character, that is to say, provides a progressively decreasing area as it recedes from the split of the ring. One convenient mode of manufacture comprises cutting a tapered shoulder eccentrically with the deepest part of the shoulder at the side of the ring having the split and the less deep part of the shoulder at the part of the ring diametrically opposite from the split. The shoulder therefore, in a direction parallel to the axis of the ring has a considerable depth next the split of the ring, that depth progressively decreasing as indicated by line 22 as the shoulder goes around the ring in both directions from the split as far as the diametrically opposite part of the ring. Thus it is that the pressure in the cylinder will have greater area and therefore greater effect upon the ring next the split than it will have at points at a distance from the split. By proportioning the depth of the shoulder next the split, to the extra force required to overcome the force exerted at the inside of the ring at that point, the ring can be maintained circular and with the same frictional contact of its cylinder engaging surface 21 all the way around the ring. The flexing of the ring next its ends or joint is likewise greater because more metal is removed there than at a distance from the joint.

As shown in connection with the ring receiving groove 16 of Fig. 1 having trapezoidal cross-section, a ring 18 is provided having correspondingly sloped flat faces, but otherwise ring 18 likewise provides an inset or stepped circumferential portion 20' which progressively decreases in area from the split 19', as upon line 22', so as to obtain the above described equalization of pressure and wear upon the cylinder engaging outer circumferential surface 21' of this ring. Plan of this ring is identical with the plan of the previously described ring, Fig. 2. The construction of groove 16 and ring 18 with tapered side walls enables the ring to seat with minimum gap permitted between the ring and cylinder wall and will reduce the "blow-by" of high compression in the cylinder operating against the stepped portion. It is not the purpose of the invention to provide sufficient area of the stepped portion to force either ring out of engagement with the cylinder wall, but merely to counteract a portion of the pressure against the cylinder wall represented by the pressure within the groove in excess of the normal resilient pressure exerted by the inherent resiliency of the ring itself. It therefore follows that the ring 17 in groove 15 having parallel walls will function to accomplish the purpose of the invention under normal operating pressure within the cylinder, but sometimes the normal pressure is raised to considerable higher than normal, and in such instances the use of a ring with tapered side walls proves particularly beneficial.

Figure 4:
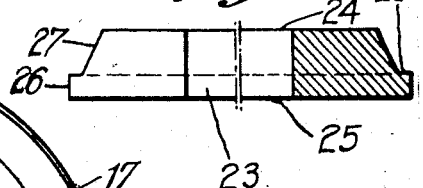
Figure 4 is a sectional view corresponding to Fig. 3, but showing the ring only and of a modified construction with the differential feature omitted.

Even though the inset or stepped circumferential wall of the ring is not differential in area as above described, but is of the same depth throughout, a degree of beneficial effect is obtained, and such a ring is illustrated by Fig. 4. Said showing indicates a ring 23 having side faces 24, 25 (here shown parallel) and a circumferential cylinder-engaging surface 26 of less depth than the over-all depth of the ring. This ring also provides an inset or stepped circumferential area 27 which slopes back toward the compression edge so as to be accessible to the cylinder compression. Preferably the sloping back begins at a radial distance inward from the cylinder engaging surface 24 thereby providing a ledge 28 perpendicular to the cylinder engaging surface and parallel to the side faces 24, 25 of the ring. This construction enables the cylinder compression to act squarely against the ledge and seat the lower face of the ring firmly upon the side face of the ring receiving groove. Thus the compression may be used to counteract the tendency of the ring to lift from its seat as the piston slides down the cylinder in frictional contact therewith. The provision of the ledge entirely around the ring obtains a positive seal and avoids a wedging of the compression gases between cylinder wall and ring.

Figure 5:
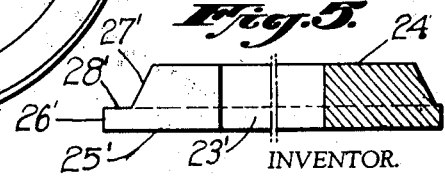
Figure 5 is a similar section wherein the differential feature is included in modified form.

The foregoing description of Fig. 4 applies equally as to Fig. 5 wherein the same reference characters for like parts are employed except for addition of prime marks thereto in Fig. 5. Figure 5 differs from the showing of Fig. 4 merely in the fact that the sloping inset or stepped area 27' is shown eccentric with respect to the outer cylinder-engaging circumferential wall, giving desired greater flexing inwardly next the split of the ring under influence of the compression in the cylinder.

It will accordingly be observed that the present invention contemplates various modifications and changes as well as combinations of disclosures, such as the differential of depth of the sloping portion of the outer circumference of Figures 1, 2 and 3 with provision of a circumferential ledge of either Figure 4 or Figure 5, and limitation of the invention is contemplated only insofar as recited in the following claims when construed in the light of the prior art.

I claim:

1. A packing ring having a stepped portion next one circumference of the ring and facing in the direction of said circumference, said stepped portion having maximum area immediately adjacent the split and decreasing from the same as a maximum to a minimum opposite the split within a segment of substantially 180° of the ring.

2. A packing ring having a transverse split at one part thereof and having a stepped portion next one circumference of the ring and facing in the direction of said circumference, said stepped portion tapering in depth and having greatest depth next said split.

3. A packing ring having a split and having parallel side walls and outer and inner circumferential walls of which one is for making a sliding seal in use, said ring having a stepped and tapered portion reducing the surface area of the said one of the circumferential walls for making sliding seal in use thereby providing a stepped back tapered surface for receiving a differential pressure thereon tending to lessen pressure toward the sliding seal, said ring having an inherently greater resistance to flexing progressively from the slit through a distance of 180° therefrom.

4. A packing ring having a cylinder-engaging circumferential surface and having a stepped and tapered circumferential surface entirely around the ring, said ring likewise providing a ledge between said circumferential surfaces and normal to the outer one thereof, said circumferential surfaces being eccentric with respect to each other and said ledge extending entirely around the ring at the outside thereof and of varying radial width.

ALBERT W. WENZEL.